INVENTOR:
DON C. BARNETT

Oct. 2, 1962 D. C. BARNETT 3,056,381
CONTROL APPARATUS
Filed Oct. 21, 1959 3 Sheets-Sheet 3
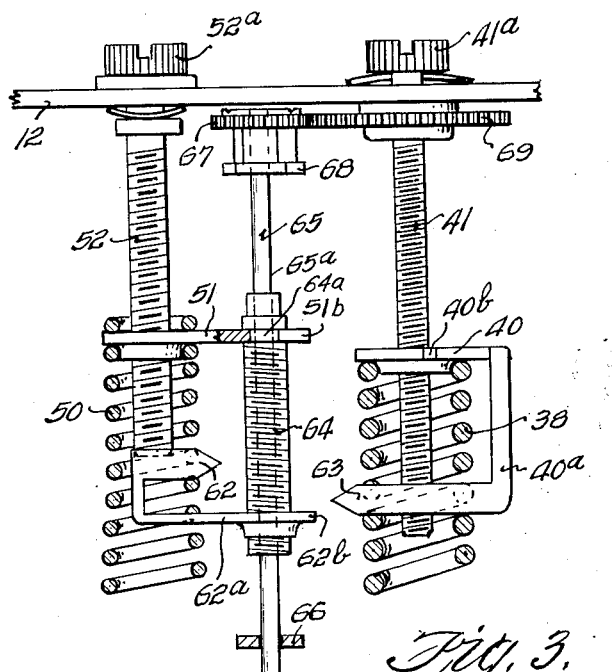
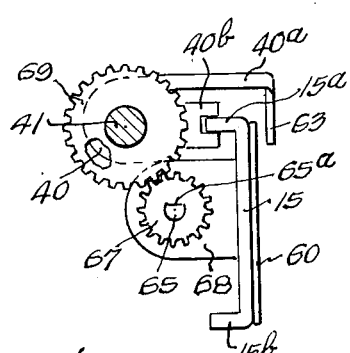
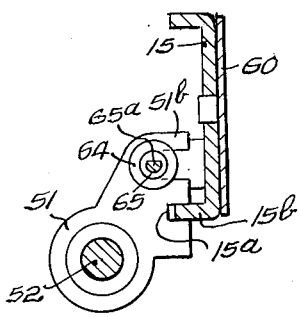
INVENTOR:
DON C. BARNETT.
BY *Roy E Raney*
ATTORNEY.

United States Patent Office 3,056,381
Patented Oct. 2, 1962

3,056,381
CONTROL APPARATUS
Don C. Barnett, Columbus, Ohio, assignor to Ranco Incorporated, Columbus, Ohio, a corporation of Ohio
Filed Oct. 21, 1959, Ser. No. 847,723
4 Claims. (Cl. 116—124)

The present invention relates to adjustable control apparatus responsive to changes in pressure to effect preselected, automatic operation of a mechanism, such as a refrigerating system, and more particularly to means for indicating the pressures at which the apparatus is adjusted to operate.

Generally, control apparatus of the type mentioned comprises a pressure responsive element, which operates an "on-off" control device, such as an electrical switch, through a lever which is biased against the pressure responsive element by a so-called "range" spring, the tension of which may be manually adjusted to vary the range of pressures at which the element operates the control device between the "on" and "off" positions. To provide an adjustment for selecting one limit of pressure at which the control device is operated, a second adjustable spring, referred to as a "differential" spring, is provided which is arranged to oppose the effect of the range spring on the pressure responsive element throughout a portion only of the movement of the element in one direction so that range spring is effective to control the pressures at which the control device is operated to one control position, such as the "off" position, and both springs are effective to determine the pressures at which the control device is moved to its other control position. For convenience in making accurate field adjustments, a scale is provided on the control apparatus which indicates the pressures at which the control device is operated, and the present invention is directed to an improved mechanism for indicating the operating pressures of the control apparatus.

An object of the present invention is the provision of indicia means, associated with the adjustments for the range and differential springs, comprising a scale plate attached to the frame of the control apparatus and having indicia thereon representing pressures at which the switch mechanism is actuated, and two pointers cooperating with the indicia, one of which indicates the maximum pressure at which the control device is operated to one control position and the other indicating the pressures at which the control device is operated to its other control position.

According to the present invention, both pointers are moved along the scale according to the adjustment in tension or length of the range spring, and one of the pointers is adapted to be shifted relative to the other pointer according to the adjustment of the differential.

By this arrangement, the one pointer is shifted relative to the other pointer according to changes in tension of the differential controlling spring but both pointers are moved in unison by adjustment of the range spring, which adjustment effects no change in the pressure differential operation.

Other objects and advantages of the invention will be apparent from the following description of a preferred form of the invention, reference being made to the accompanying drawings wherein FIG. 1 is a front elevational view of a control apparatus embodying the invention, the cover of which apparatus has been removed;

FIG. 3 is a reduced fragmentary view of the spring adjusting mechanism and the pointers associated therewith;

FIG. 4 is a fragmentary sectional view taken substantially along line 4—4 of FIG. 2; and FIG. 5 is a fragmentary sectional view taken substantially along line 5—5 of FIG. 2.

Figure 1:
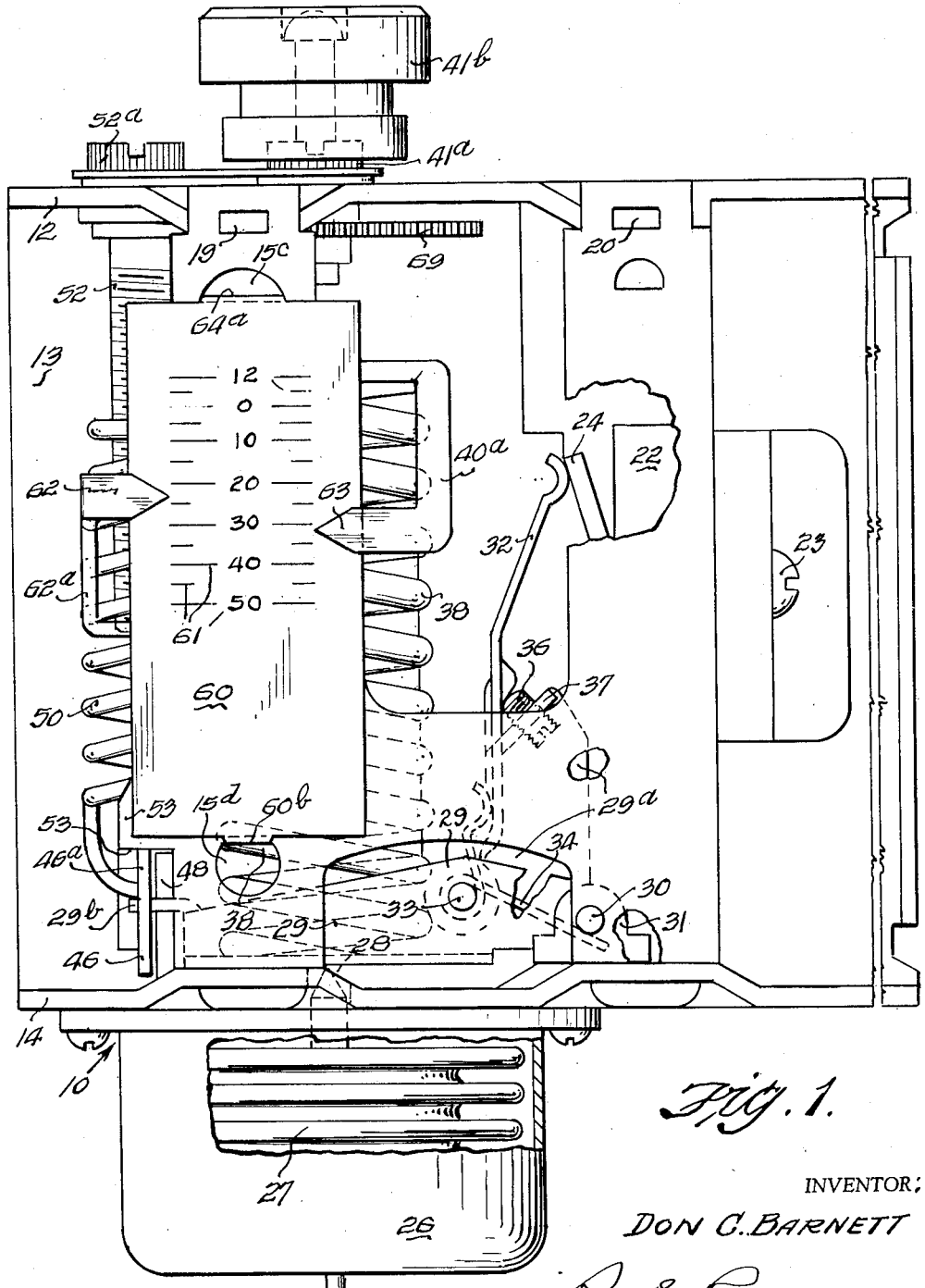

For the purpose of illustrating the invention, I have shown a control apparatus 10 which is particularly suitable for controlling an electric motor of a mechanical refrigerating system, although the invention could be embodied in control apparatus for other types of mechanisms the operations of which are reflected by changes in pressures. In the embodiment shown, control apparatus 10 comprises a rigid channel shaped frame 11 which provides a top wall 12, a side wall 13 and a bottom wall 14 to which the various components of the control apparatus are attached, and the ends and open side of the frame may be closed by a suitable cover, not shown. The frame includes an H-shaped strut plate 15 attached to the forward edges of the top and bottom walls 12 and 14, the lower ends of the strut having tabs formed thereon which extend through slots in wall 14 and the upper ends of which have openings to receive lugs 19 and 20 formed in notches in the edges of top wall 12, the lugs being staked or peened to secure the strut thereto.

A snap acting switch mechanism indicated generally at 22, is suitably attached to the frame, as by a screw 23, and which includes an actuator member 24 which oscillates to the left and right as viewed in FIG. 1, to open and close the switch respectively and is biased toward the left or switch opening position. Any suitable type of switching mechanism could be employed and since such mechanisms are well known the details are not shown here. The switching mechanism is arranged to control the circuit of an electric motor for driving a refrigerating system to be controlled by apparatus 10, but for sake of simplicity the refrigerating system is not shown.

Switch actuating member 24 is operated by expansion and contraction of a pressure responsive element 26 attached to bottom wall 14 and which includes a metallic bellows 27 connected by a tube 27a to the evaporator of the refrigerating system so that the pressure in the bellows corresponds to the temperature of the evaporator. If desired, tube 27a could be connected to a bulb subjected to the temperature of the evaporator, and containing a vapor, the pressure of which corresponds to the temperature of the bulb, as is well known in the control art. The top wall of bellows 27 has a post 28 attached thereto which projects through an opening in wall 14 and engages the underside of a channel shape switch lever 29 pivoted to a pin 30 supported by two spaced upright lugs struck from wall 14 and one of which is shown at 31. An arm 32 is pivoted to lever 29 by a pin 33 which is journaled in openings in the side flanges of the lever, and a spring 34 encircling pin 33 has one end engaging pin 30 and the opposite end engaging arm 32 to maintain the latter clockwise against a screw stop 36 threaded in a lug 37 formed on an upright portion 29a of lever 29. It will be seen that as the pressure in bellows 27 increases, lever 29 is rotated clockwise which moves arm 32 against actuator 24 to a position in which switch mechanism 22 is operated to closed position. This movement of lever 29 is opposed by a range spring 38, the bottom of which rests on the lever and the opposite end of which is engaged in a plate 40 threaded on a shaft 41 rotatably supported in an opening in top wall 12. It will be seen that as pressure in bellows 27 decreases, spring 38 urges lever 29 and arm 32 counterclockwise so that actuator 24 follows the arm to the switch opening position.

The spring engaging plate 40 includes a notched lug 40b which receives an inturned flange 15a of strut member 15 to prevent rotation of the plate by rotation of shaft 41, the upper end of which is serrated as at 41a to receive an adjusting knob 41b attached thereto by which the shaft can be rotated to cause the plate to travel up or down the threaded shaft in the manner of a nut and thereby change the compression of spring 38. It will be understood by those familiar with the art that as the tension of spring 38 is increased the range of pressures at which switch 22 is opened and closed increases, and vice versa.

Figure 2:
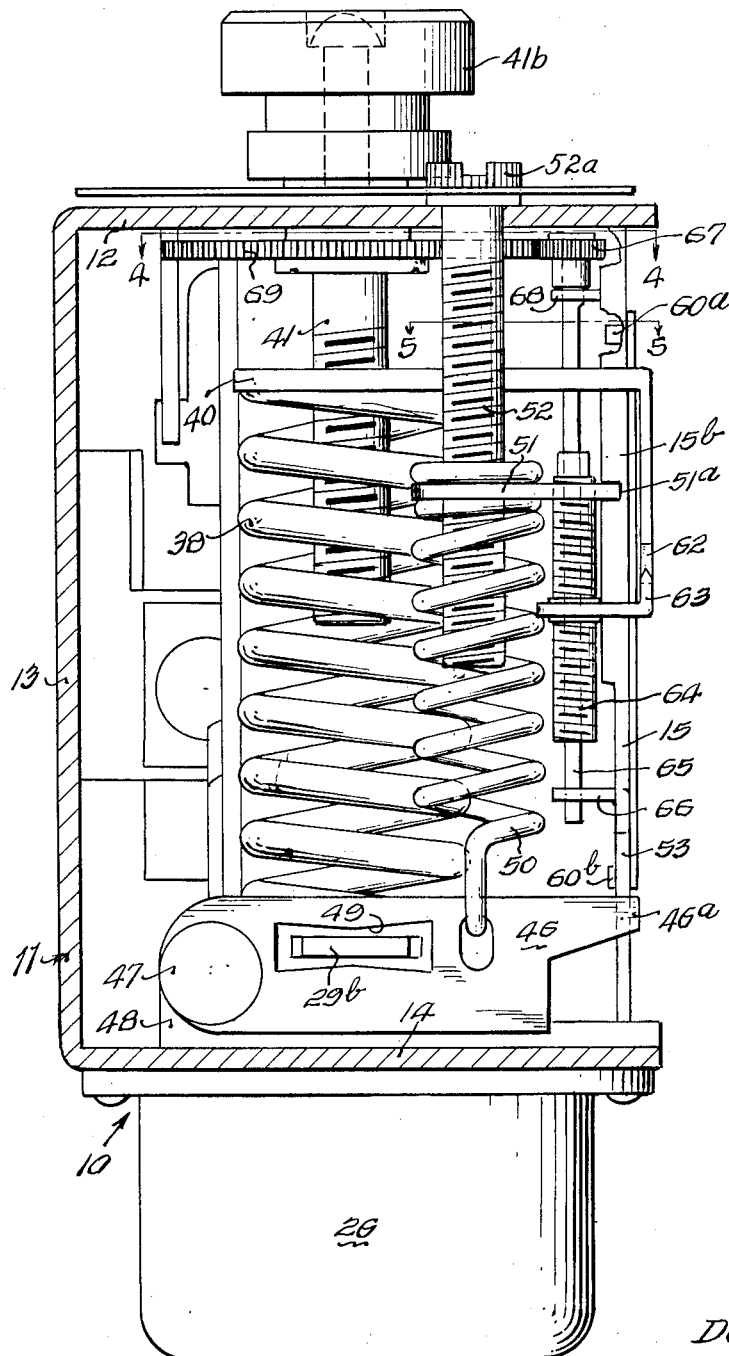
FIG. 2 is an end view of the control apparatus shown in FIG. 1 with the frame thereof being shown in section.

It will be apparent that as the pressure in bellows 27 decreases after closing switch 22, spring 38 causes lever 29 to move counterclockwise until arm 32 is swung to a given position at which switch 22 is reopened. In order to adjustably control the pressures at which switch 22 is reopened, lever 29 is arranged to engage a second lever 46 during its counterclockwise movement toward the switch opening position. Lever 46 is pivoted by a pin 47, journaled in an opening through a lug 48 projecting upwardly from bottom wall 14, and has an opening 49 therethrough through which a tongue 29b formed on lever 29 projects. Lever 46 is normally urged upwardly or counterclockwise, as viewed in FIG. 2, by a tension spring 50, referred to as the "differential" spring, one end of which is connected in an opening in lever 46 and the opposite end of which is secured by having the end convolution thereof threaded on a plate 51 which is threaded on a screw 52 rotatably supported in an opening in top wall 12. Upward movement of lever 46 is limited by a projecting finger 46a thereon engaging the lower edge of a shoulder 53 formed on strut member 15 so that during movement of lever 29 toward the switch closing position, lever 46 is blocked to remove the effect of spring 50 from lever 29. Thus, the switch closing pressure is controlled by the tension of the range spring 38 and the switch opening pressure is determined by the tension of the range spring less the effect of the differential spring 50.

The upper end of screw 52 has a slotted head 52a by which the screw can be rotated by a screwdriver, and it will be seen that by turning the screw, plate 51 is moved therealong in one direction or the other to adjust the tension of spring 50 whereby the pressures at which the switch is opened can be closely calibrated without affecting the pressures at which the switch is closed. Plate 51 is prevented from rotation with screw 52 by a notch 51a therein which receives a flange 15b on strut 15, as clearly seen in FIG. 5.

The general structure described thus far is well known in the art, and is not necessarily a part of the invention, that is to say, the exact details need not be employed in carrying out the invention. The present invention provides improved means for indicating the pressure limits at which switch 22 is opened and closed, and comprises a scale plate 60 which is fixedly attached to the front surface of strut member 15 by lugs or tabs 60a at top and bottom of the plate extending through openings 15c and 15d and bent rearwardly and inwardly. Plate 60 includes indicia 61, which may be of any appropriate type, and in the form shown, it includes at the upper limit 12″ to indicate 12″ of vacuum, and "0," "10," "20," "30," "40" and "50" to indicate pounds pressure.

Two pointers 62 and 63 cooperate with the scale to indicate the pressures at which the control is set to open and close the switch 22, respectively. Pointer 63 is attached to plate 40 by an arm 40a and projects at right angles thereto and has a pointed end to accurately indicate the pressure markings on the scale to correspond with the tension of spring 38, which is a function of its length. It will be apparent that as the length of range spring 38 is varied by rotation of screw 41 causing plate 40 to be raised and lowered, pointer 63 will indicate the upper limit of pressure of operation of switch 22.

The second pointer 62 is attached to an arm 62a which projects from a nut 62b threaded on a shaft 64. Shaft 64 is hollow and has a drive pin 65 extending therethrough, which pin has a flattened surface 65a cooperating with a flat portion at the upper end of the opening through the shaft so that the shaft is rotated by the pin while permitting the shaft to move along the pin. Pin 65 is rotatably supported at its lower end in a rearwardly extending lug 66 formed in strut member 15 and the upper end thereof is driven by a pinion 67 attached thereto and rotatably supported in a bearing lug 68 formed from strut 15. Pinion 67 is driven by a gear wheel 69 attached to adjusting screw 41, and since the gear wheel is considerably larger than the pinion, the pitch of the threads on shaft 64 is correspondingly less than that of the threads on screw 41 so that movement of nut 62b along the shaft is at the same rate as the movement of plate 40 along screw 41. Thus, the movement of pointers 62 and 63 along the scale are equal so that as the tension of range spring 38 is adjusted the pointers move in a fixed relationship up and down the scale.

Pointer 62 is adapted to be shifted relative to pointer 63 according to variations in the tension adjustment of differential spring 50 and for this purpose nut 51 has a projecting portion 51b recessed to rotatably receive a grooved portion 64a around the upper end of threaded shaft 64 so that as nut 51 moves up or down screw 52 as spring 50 is adjusted, shaft 64 and pointer 62 are likewise shifted, shaft 64 being guided along pin 65. Thus, as the differential is shifted by adjustment of spring 50, pointer 62 is moved correspondingly relative to pointer 63 to indicate the exact pressures at which the control is set to cause switch 22 to be opened.

It will be understood that the cover for the frame has a window therein through which the scale plate and pointers are visible.

The improved indicating mechanism provides a stationary scale plate and movable pointers which give a direct reading on the scale of the switch operating pressures according to the range and differential adjustments.

While but one form of the invention has been described, it is to be understood that other forms, modifications and adaptations could be made thereof, all of which falls within the scope of the claims which follow.

I claim:

1. In control apparatus including a frame, two movable adjusting members for adjusting different control characteristics of the apparatus, a scale plate attached to said frame and having indicia thereon, a first pointer connected with one of said movable adjusting members and movable along the indicia of said scale plate according to movement of said one adjusting member, a second pointer, means to move said second pointer along the indicia on said scale plate in accordance with movement of said one adjusting member and said first pointer, and means to shift said second pointer relative to said first pointer according to movement of the other of said adjusting members.

2. In control apparatus including a frame, two movable adjusting members for adjusting different control characteristics of the apparatus, a scale plate attached to said frame and having indicia thereon, a pointer connected with one of said movable adjusting members and movable along the indicia of said scale plate according to movement of said one adjusting member, a second pointer, a member carrying said second pointer, means to move said pointer carrying member to cause said second pointer to travel along the indicia on said scale plate in accordance with movement of the first mentioned movable adjusting member, so that said second pointer moves in unison with said first pointer, and means to move said second pointer relative to said member carried thereby in correspondence with movement of said second mentioned adjusting member.

3. In control apparatus including a frame, two movable adjusting members for adjusting different control characteristics of the apparatus, a scale plate attached to said frame and having indicia thereon, a pointer connected to one of said movable adjusting members and movable along the indicia of said scale plate according to movement of said one adjusting member, a threaded shaft, means to guide said shaft longitudinally in a direction parallel to movement of said first pointer, a pointer threaded on said shaft and cooperating with the indicia on said scale, means to rotate said shaft in accordance with movement of said one adjusting member to cause said pointer to move along said shaft and scale, and means connecting said shaft to the other of said adjusting members for moving said shaft longitudinally in correspondence with movement of said second mentioned adjusting member.

4. In a control apparatus having a control device operated by pressure responsive mechanism, two screws rotatable to adjust the pressures at which said control device is actuated from one position to another by said pressure responsive means, a frame, a scale plate attached to said frame, a pointer device cooperating with said scale and threaded on one of said screws for movement along said scale by rotation of said one screw, a second pointer cooperating with indicia on said scale, a threaded shaft, said second pointer being threaded on said shaft whereby rotation of said shaft causes movement of said second pointer therealong and along said scale, means to rotate said shaft in synchronism with rotation of said first mentioned screw, means interconnecting the second of said screws and said shaft for shifting said shaft axially in accordance with rotation of said second screw.

References Cited in the file of this patent

UNITED STATES PATENTS 2,316,286    Raney  ---------------- Apr. 13, 1943